United States Patent
Shinde

(10) Patent No.: US 11,231,126 B2
(45) Date of Patent: Jan. 25, 2022

(54) VALVE SEAL FOR FAUCET ASSEMBLY

(71) Applicant: THE BOEING COMPANY, Chicago, IL (US)

(72) Inventor: Jagdish Shinde, Bangalore (IN)

(73) Assignee: THE BOEING COMPANY, Chicago, IL (US)

(*) Notice: Subject to any disclaimer, the term of this patent is extended or adjusted under 35 U.S.C. 154(b) by 44 days.

(21) Appl. No.: 16/741,975

(22) Filed: Jan. 14, 2020

(65) Prior Publication Data

US 2021/0215270 A1 Jul. 15, 2021

(51) Int. Cl.
| F16K 11/074 | (2006.01) |
| F16K 41/04  | (2006.01) |
| E03C 1/04   | (2006.01) |
| F16K 31/60  | (2006.01) |

(52) U.S. Cl.
CPC ............ *F16K 41/04* (2013.01); *E03C 1/0403* (2013.01); *E03C 1/0412* (2013.01); *F16K 31/605* (2013.01)

(58) Field of Classification Search
CPC .......... F16K 3/08; F16K 31/605; F16K 41/04; E03C 1/0403; Y10T 137/6014; Y10T 137/6021; Y10T 137/6024; Y10T 137/86823; Y10T 137/9464; Y10T 137/87579; Y10T 137/87668
See application file for complete search history.

(56) References Cited

U.S. PATENT DOCUMENTS

| 1,418,664 | A |   | 6/1922  | McNeeil |            |
|-----------|---|---|---------|---------|------------|
| 2,324,946 | A |   | 7/1943  | Molloy  |            |
| 2,397,269 | A |   | 3/1946  | Kelly   |            |
| 2,576,414 | A | * | 11/1951 | Petersen | F16K 31/58 |
|           |   |   |         |         | 137/616.7  |
| 2,864,398 | A | * | 12/1958 | Green   | F16K 11/0565 |
|           |   |   |         |         | 137/327    |
| 2,988,110 | A | * | 6/1961  | Thomas  | F16K 19/00 |
|           |   |   |         |         | 137/636.4  |
| 4,475,573 | A | * | 10/1984 | Hindman | F16K 11/074 |
|           |   |   |         |         | 137/625.41 |
| 5,660,208 | A | * | 8/1997  | Tres Casas | E03C 1/04 |
|           |   |   |         |         | 137/625.17 |

(Continued)

OTHER PUBLICATIONS

Non-Final Office Action for U.S. Appl. No. 16/742,267 dated Jan. 7, 2021.

*Primary Examiner* — Reinaldo Sanchez-Medina
(74) *Attorney, Agent, or Firm* — Marshall, Gerstein & Borun LLP

(57) ABSTRACT

A faucet assembly includes a housing which includes a first faceplate defining a first and second opening which extend through the first faceplate and spaced apart and a seal member on the first faceplate which surrounds the first and second openings. A cartridge assembly positioned within an opening in the housing which includes a second faceplate, which abuts the seal member and forms a seal between the second faceplate and the seal member. Second faceplate defines third opening which extends through the second faceplate. With rotation of the second faceplate, third opening changes position relative to first faceplate to include the third opening positioned in one of: alignment with a portion of first opening and a portion of second opening, alignment with the first opening or alignment with the second opening.

20 Claims, 11 Drawing Sheets

(56) References Cited

U.S. PATENT DOCUMENTS

| | | | |
|---|---|---|---|
| 6,234,209 B1 | 5/2001 | Viegener | |
| 7,694,935 B2 | 4/2010 | Wang | |
| 8,707,983 B1 | 4/2014 | Chen | |
| 2009/0038686 A1* | 2/2009 | Lin | F16K 3/08 |
| | | | 137/39 |

* cited by examiner

VALVE SEAL FOR FAUCET ASSEMBLY

FIELD

The present disclosure relates to a faucet assembly and more particularly to a valve which controls flow of water into a cartridge assembly and adjusts the temperature of the water in the cartridge assembly of the faucet assembly.

BACKGROUND

There is a need for faucet assemblies to provide desired temperature of water to the user. A faucet assembly, in one example, utilizes a single handle connected to a blocking wall assembly, which is positioned within a chamber of a cartridge assembly of the faucet assembly. Rotating the single handle rotates the position of the blocking wall assembly within the chamber of the cartridge assembly, which positions the blocking wall assembly in different blocking positions relative to pressurized hot and cold water supply inlets which, supplies water to the chamber and thereby changes the temperature of the water within the chamber of the cartridge assembly.

As the handle is rotated in one direction, the blocking wall assembly decreases the blocking of the inlet of the hot water supply and increases blocking of the of the inlet of the cold water supply, the water temperature increases within the chamber of the cartridge assembly. The increased water temperature within the chamber within the cartridge assembly permits increased temperature of water which ultimately reaches the faucet outlet, with a valve cartridge assembly positioned in an open position, which is in fluid communication with the chamber of the cartridge assembly and in fluid communication with the faucet outlet.

With the user rotating the handle in an opposite direction, the blocking wall assembly increases the blocking of the inlet of hot water supply and decreases blocking of the inlet of cold water supply, the water temperature decreases within the chamber of the cartridge assembly. The decreased water temperature within the chamber within the cartridge assembly permits decreased temperature of water which ultimately reaches the faucet outlet, with the valve cartridge assembly positioned in an open position, which is in fluid communication with the chamber of the cartridge assembly and in fluid communication with the faucet outlet.

With the handle rotated in the one direction to an extreme position, the blocking wall member assembly completely blocks the cold water inlet and completely unblocks the hot water inlet raising the temperature of the water in the chamber of the cartridge assembly to the temperature of the water of the hot water supply. This increased temperature of water reaches the faucet outlet with the valve cartridge positioned in an open position. With the handle rotated in the opposite direction to an extreme position, the blocking wall member assembly completely blocks the hot water inlet and completely unblocks the cold water inlet lowering the temperature of the water in the chamber of the cartridge assembly to the temperature of the water of the cold water supply. This decreased temperature of water reaches the faucet outlet with the valve cartridge positioned in an open position.

Often in such faucet assemblies, the raising or lowering of the handle will operate the valve cartridge assembly to open or close the valve cartridge assembly thereby permitting water to flow from the chamber of the cartridge assembly through the valve cartridge assembly to the faucet outlet. In this example, pushing the handle downwardly will cause water to flow to the faucet outlet and with the handle positioned in a raised position the water flow to the faucet outlet is stopped.

In these faucet assemblies, the blocking wall assembly is often constructed of plastic and is rotated along a wall of the chamber of the cartridge assembly, often constructed of metal. With the blocking wall assembly positioned in a full blocking relationship or in partial blocking relationship with respect to pressurized hot water inlet and pressurized cold water inlet, water leaks about the blocking wall assembly into the cartridge chamber. The leaking of hot and/or cold water from the inlets results in imprecise water temperature being positioned within the chamber of the cartridge assembly with respect to the user's rotated positioning of the handle. As a result, with the pressurized water being released from the chamber of the cartridge assembly through the valve cartridge assembly to the faucet outlet, precision in the temperature of the water for the user is not attained. As a result, there is a need to attain precision in the temperature of water that exits the faucet outlet of the faucet assembly to the user of the faucet and a method to attain such precision.

SUMMARY

An example includes a faucet assembly which includes a faucet assembly, which includes a housing which includes a first faceplate wherein the first faceplate defines a first opening and second opening which extend through the first faceplate and are spaced apart from one another. A seal member positioned on the first faceplate, wherein the seal member surrounds the first opening and the second opening and a cartridge assembly positioned within an opening in the housing. The cartridge assembly includes a second faceplate, which abuts the seal member and forms a seal between the second faceplate and the seal member. The second faceplate defines a third opening which extends through the second faceplate, wherein with rotation of the second faceplate, the third opening changes position relative to the first faceplate to include the third opening positioned in one of: alignment with a portion of first opening and with a portion of the second opening, alignment with the first opening or alignment with the second opening.

An example includes a method for installing a cartridge assembly into a housing of a faucet assembly, which includes inserting the cartridge assembly into an opening of the housing of the faucet assembly. The housing includes a first faceplate wherein the first faceplate defines a first opening and second opening, which extend through the first faceplate and are spaced apart from one another. A seal member is positioned on the first faceplate, wherein the seal member surrounds the first opening and the second opening. The method further includes abutting a second faceplate of the cartridge member against the seal member forming a seal between the second faceplate and the seal member. The second faceplate defines a third opening which extends through the second faceplate. With rotation of the second faceplate of the cartridge assembly, the third opening changes position relative to the first faceplate to include the third opening positioned in one of: alignment with a portion of first opening and with a portion of the second opening, alignment with the first opening or alignment with the second opening.

The features, functions, and advantages that have been discussed can be achieved independently in various embodiments or may be combined in yet other embodiments further details of which can be seen with reference to the following description and drawings.

DESCRIPTION

Figure 1:
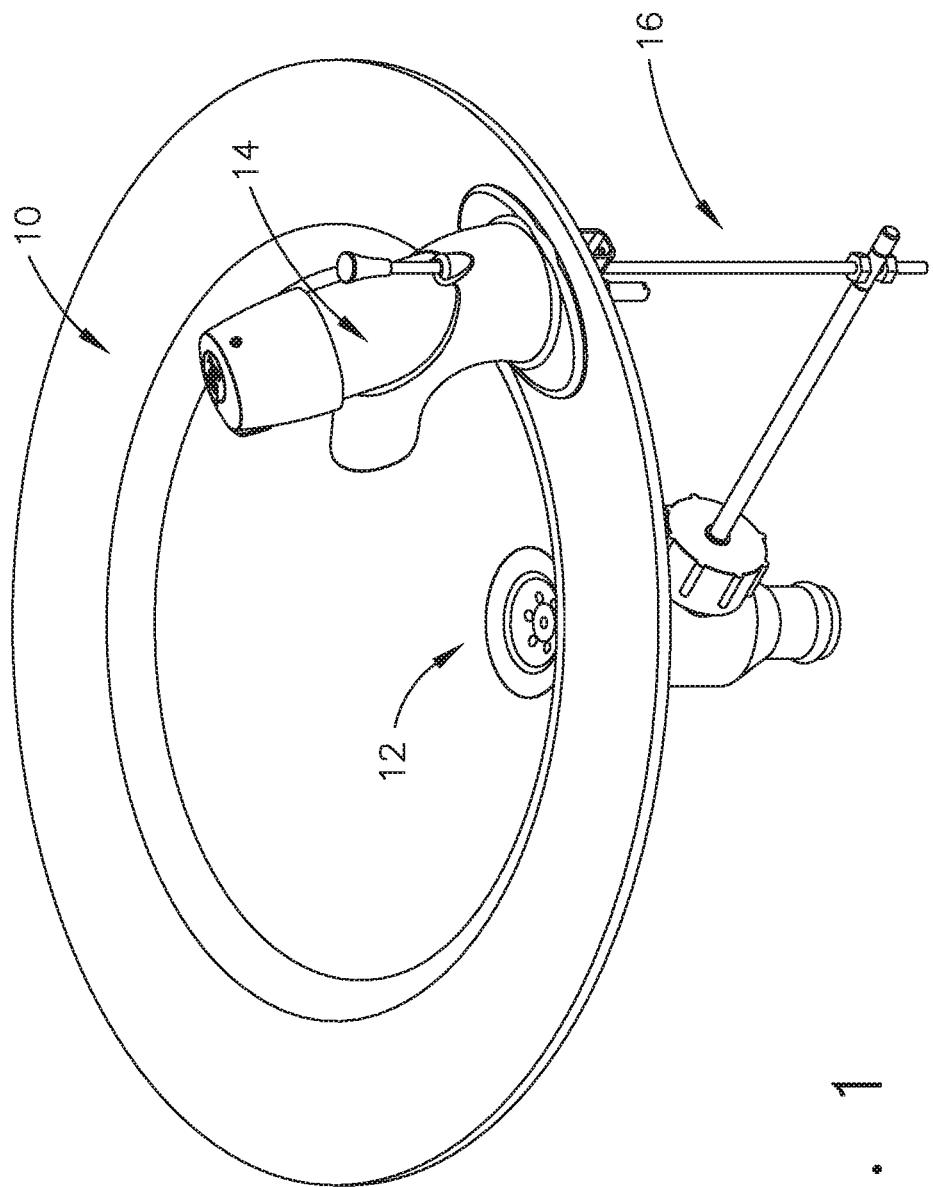
FIG. 1 is a perspective view of a basin with a faucet assembly and a drain assembly.
Figure 2:
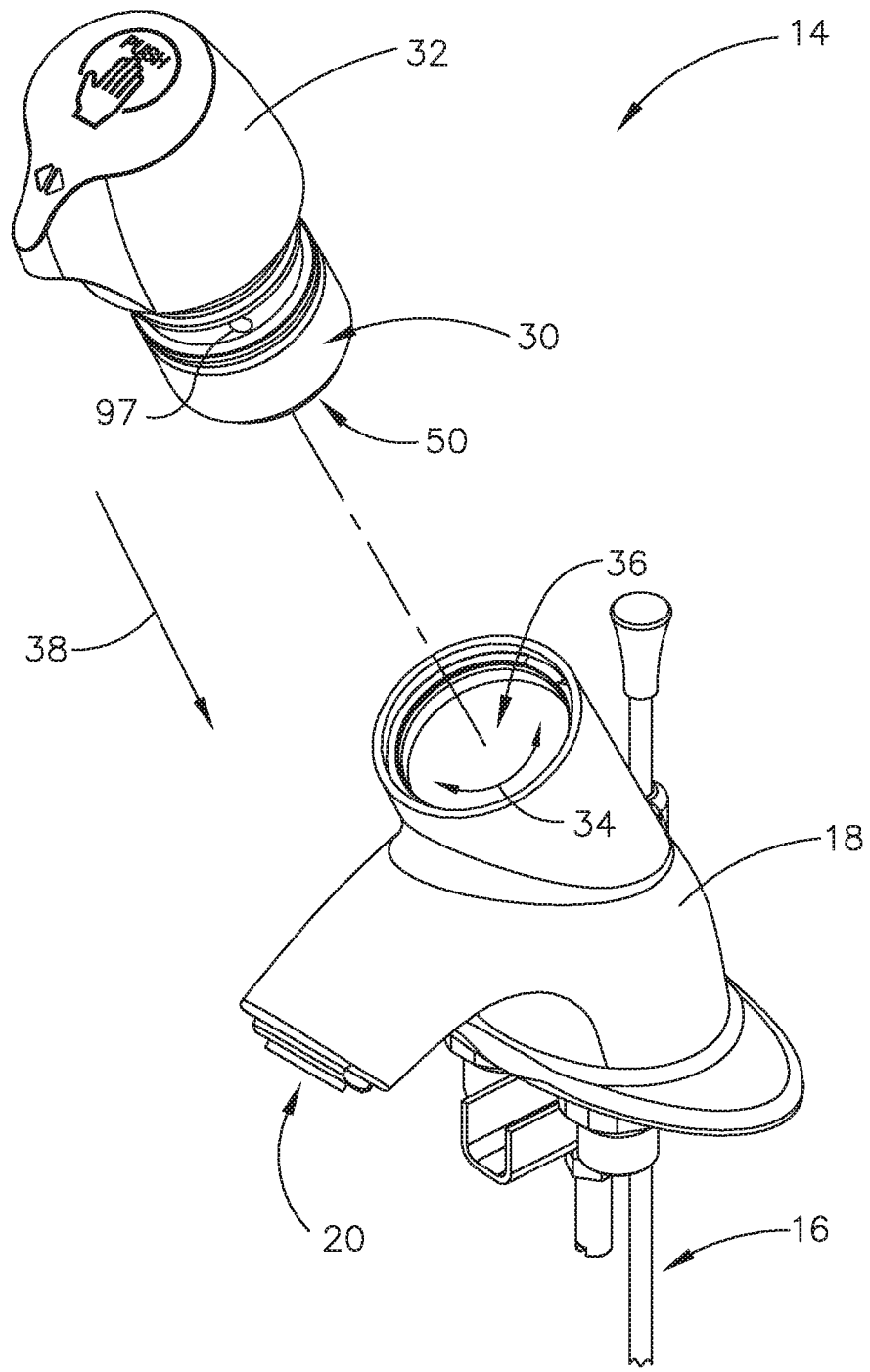
FIG. 2 is a perspective exploded view of a cartridge assembly and associated handle of the faucet assembly wherein the cartridge assembly is separated from housing of the faucet assembly.

In referring to FIG. 1, basin 10 is shown with drain 12, faucet assembly 14 and drain opening and closing mechanism 16. With there being a need to provide a user of faucet assembly 14 precision in water temperature, faucet assembly 14, as discussed herein, provides the user precision in water temperature delivered to the user. Faucet assembly 14, as seen in FIG. 2-6, includes housing 18, which includes faucet outlet 20, as well as, first connector 22 for connecting first pressurized water supply conduit 24 (seen in phantom in FIG. 3) and second connector 26 for connecting second pressurized water supply conduit 28 (seen in phantom in FIG. 3). Faucet assembly 14 further includes cartridge assembly 30, as seen in FIGS. 2, 5, 6 and 11, and includes handle 32 which is secured to cartridge assembly 30 such that rotating handle 32 rotates cartridge assembly 30 in rotating direction 34 within opening 36 of housing 18, as seen in FIG. 2. With rotating handle 32 and cartridge assembly 30 in rotating direction 34, the temperature of the water which exits faucet outlet 20 changes, as will be discussed in more detail herein. In addition, handle 32 can also be pushed in downwardly direction 38 relative to housing 18 by the user, which permits flow of pressurized water which has entered faucet assembly 14 through first connector 22 and second connector 26 into housing 18, to cartridge assembly 30 and into valve cartridge assembly 40 and exit faucet outlet 20, as will also be discussed herein.

Figure 5:
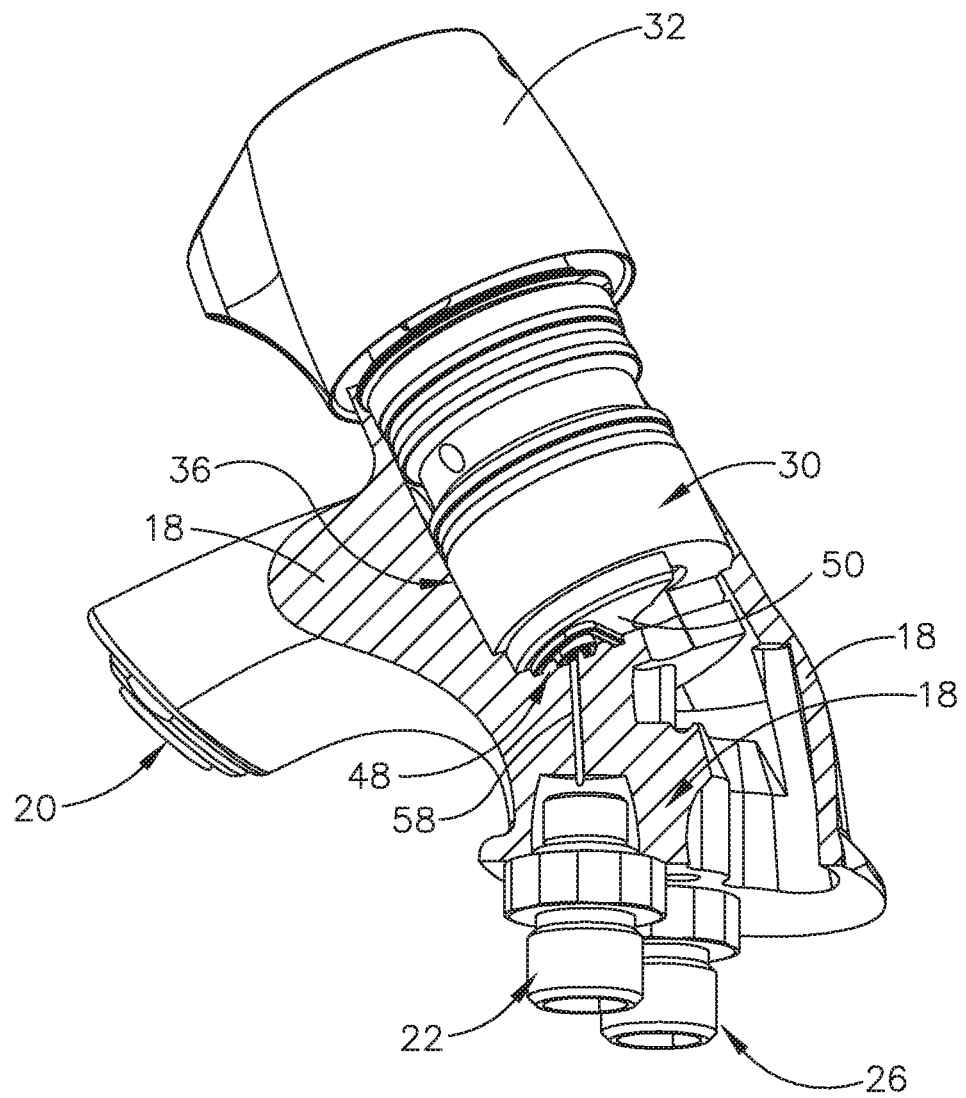
FIG. 5 is a perspective partial broken away view of the faucet assembly of FIG. 3.
Figure 6:
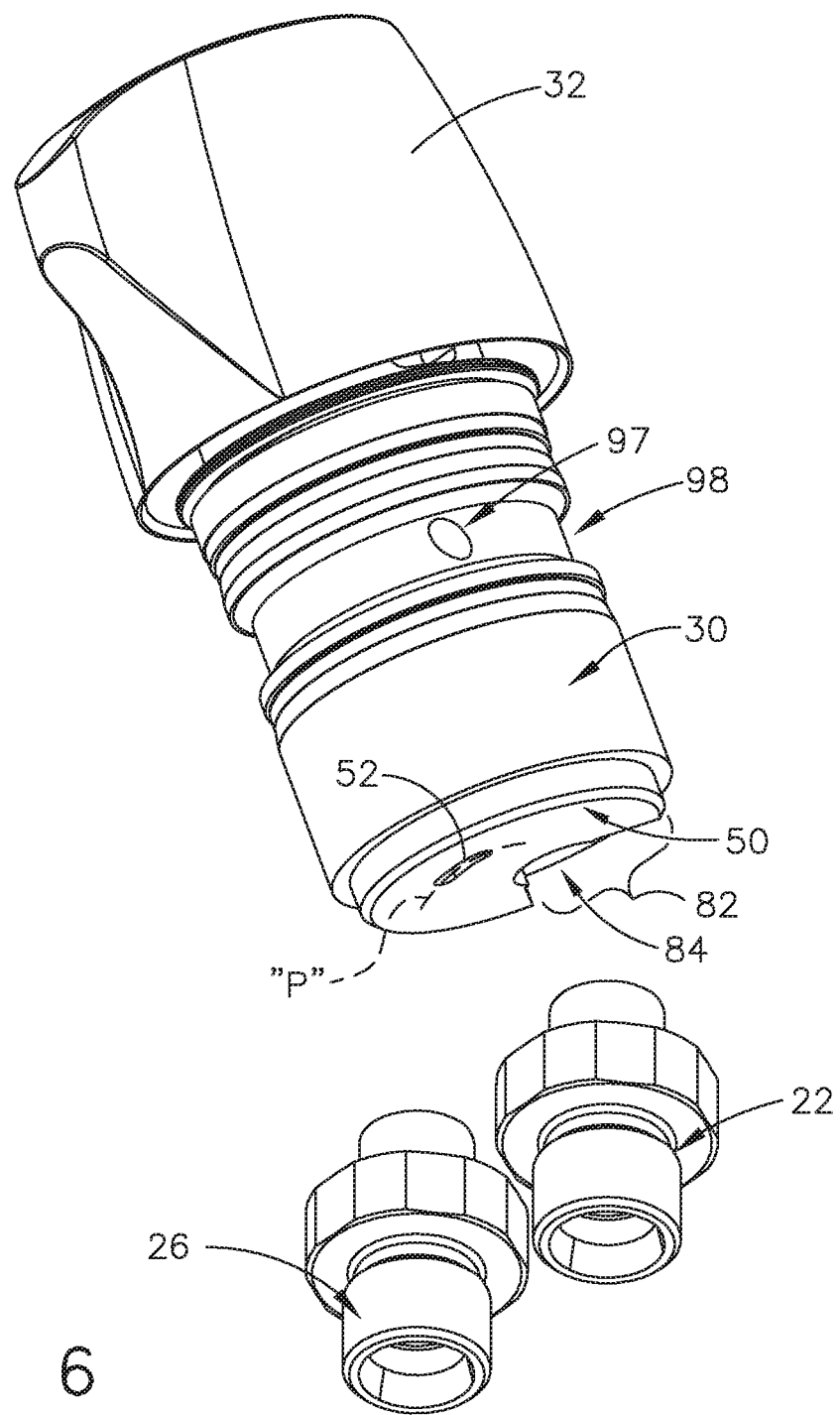
FIG. 6 is an isolated perspective underside view of the cartridge assembly associated with the handle of the faucet assembly with an isolated perspective view of first and second connectors which provide cartridge assembly water from pressurized hot and cold water supply conduits as seen in FIG. 3.
Figure 7:
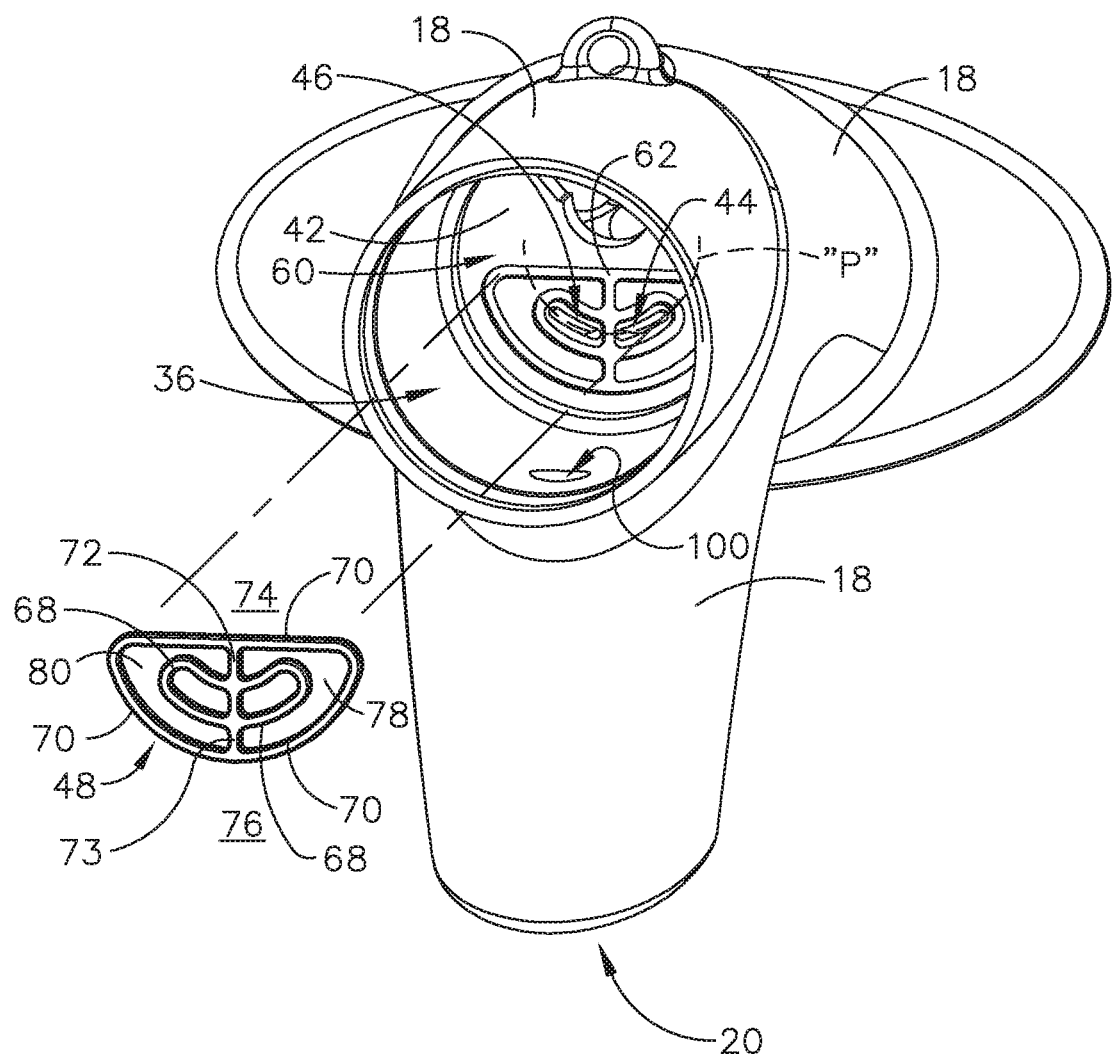
FIG. 7 is a top perspective view of the housing of the faucet assembly of FIG. 2 with the cartridge assembly and associated handle removed and a face seal is in an exploded view with respect to a first faceplate of the housing.
Figure 8:
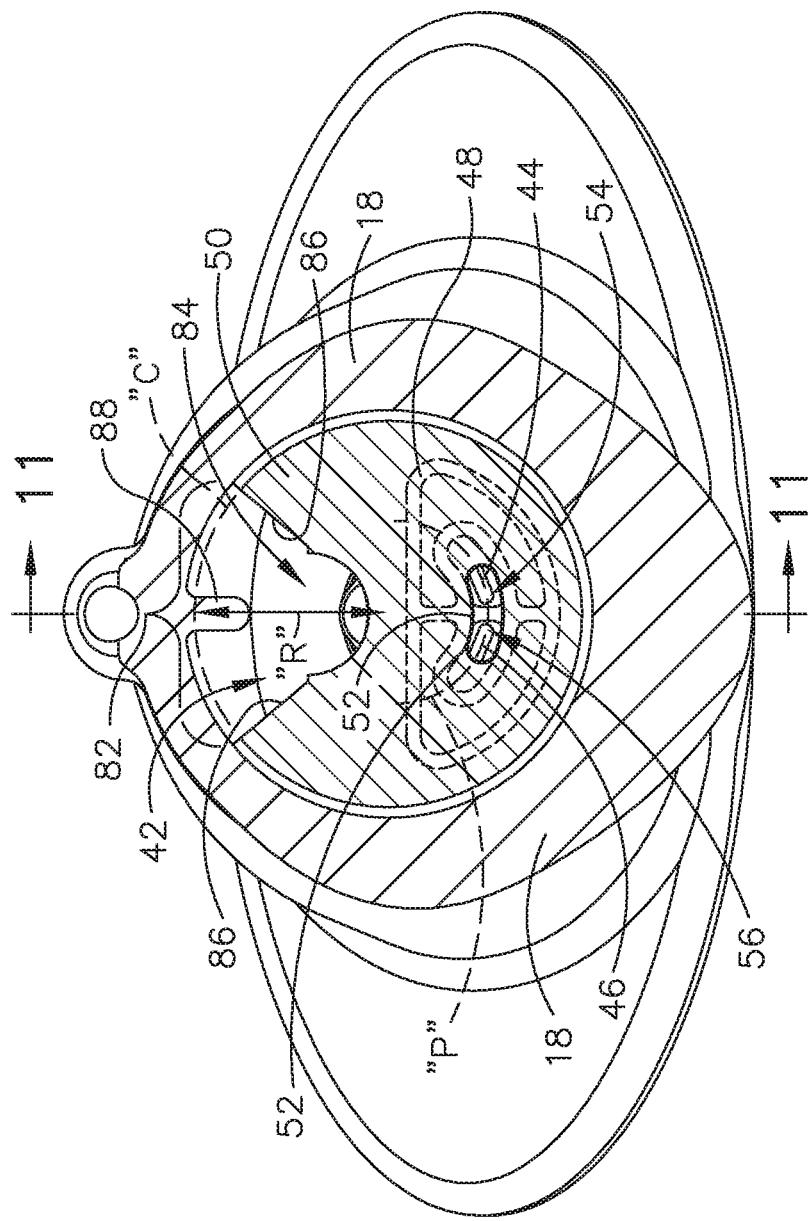
FIG. 8 is a cross section view along line 8-8 of FIG. 4, wherein the cross section extends through a second faceplate of the cartridge assembly positioned within the housing of the faucet assembly which is in abutting relationship with respect to face seal of the first faceplate of the housing.
Figure 9:
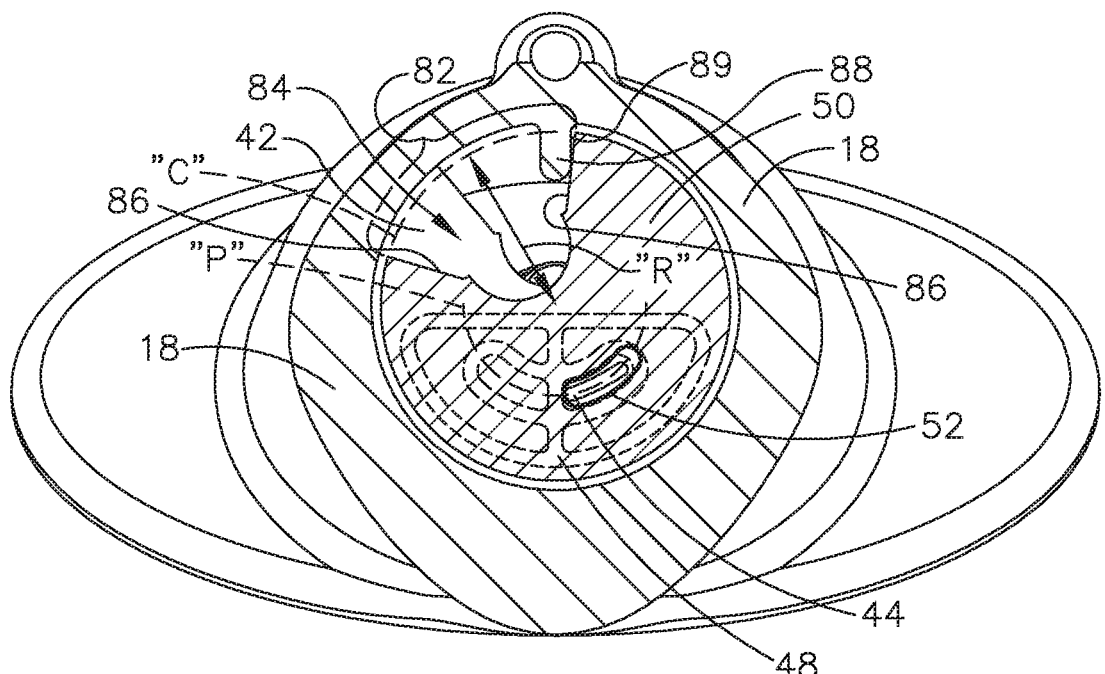
FIG. 9 is the view of FIG. 8 with the second faceplate of the cartridge assembly positioned rotated within the housing in one direction relative to the first faceplate of the housing in FIG. 8, with a sidewall of the second faceplate abutting a first side of the stop member of the housing.
Figure 10:
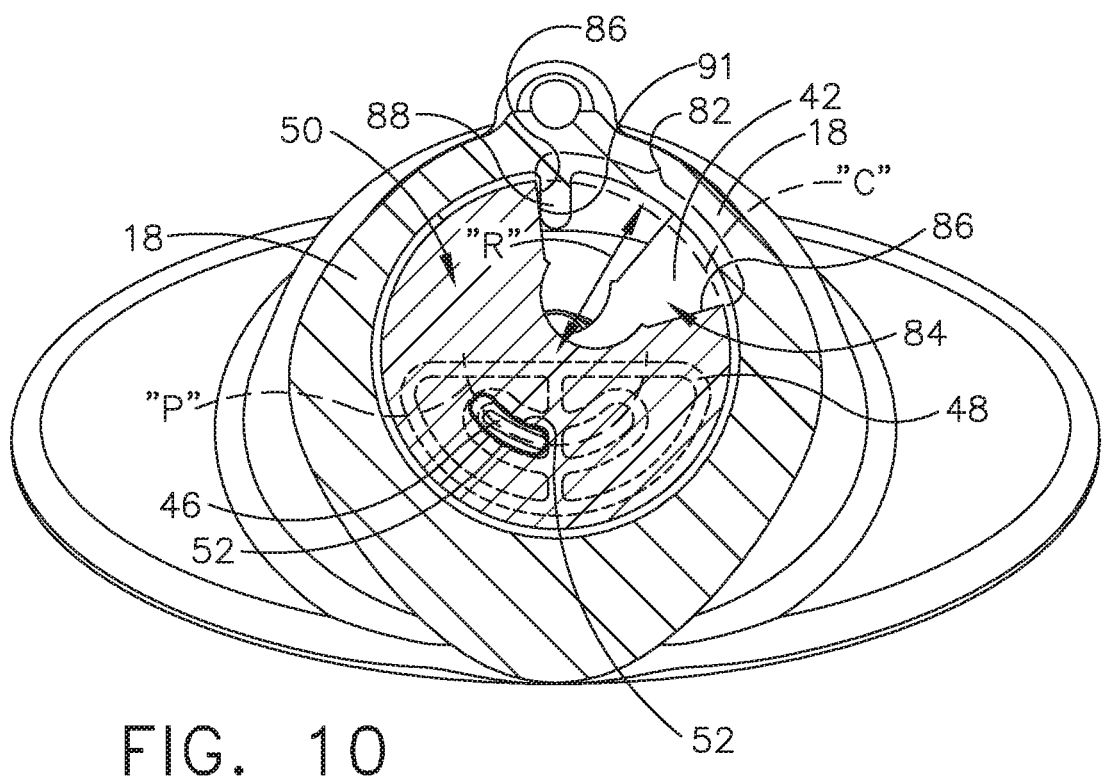
FIG. 10 is the view of FIG. 8 with the second faceplate of the cartridge assembly positioned rotated in a second opposite direction relative to the first faceplate of the housing in FIG. 8, with a sidewall of the second faceplate abutting a second side of the stop member of the housing.
Figure 11:
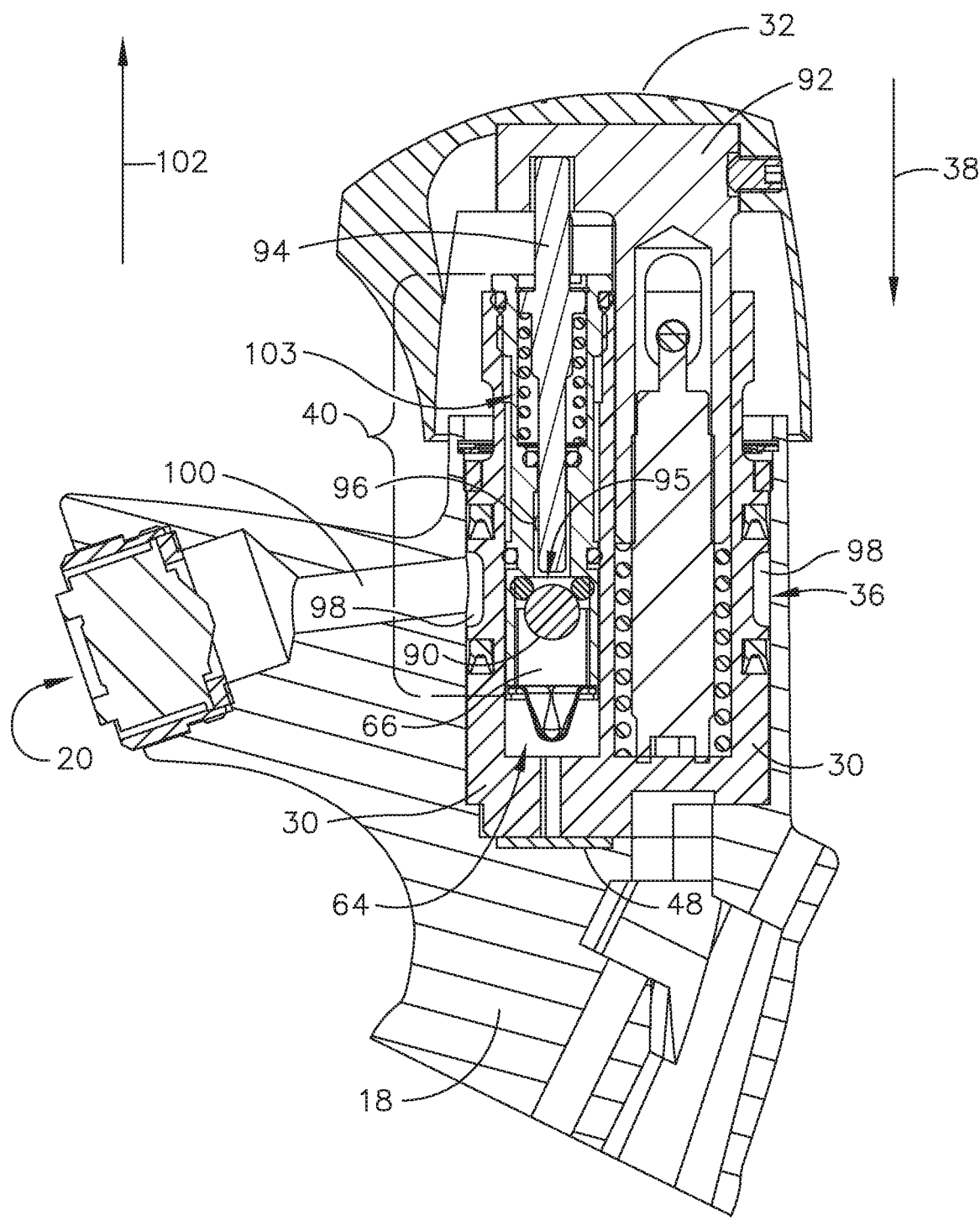
FIG. 11 is a cross section of the faucet assembly along the line 11-11 of FIG. 8.

Faucet assembly 14 includes housing 18, which includes first faceplate 42, as seen in FIG. 7, wherein first faceplate 42 defines first opening 44 and second opening 46 which extend through first faceplate 42 and are spaced apart from one another. Seal member 48 is positioned on first faceplate 42, wherein seal member 48 surrounds first opening 44 and second opening 46. Cartridge assembly 30 is positioned within opening 36 in housing 18, as seen in FIGS. 2, 5 and 11. Cartridge assembly 30 includes second faceplate 50, as seen in FIG. 6, which abuts seal member 48 and forms a seal between second faceplate 50 and seal member 48. Second faceplate 50 defines third opening 52, as seen in FIGS. 6 and 8-10, which extends through second faceplate 50, wherein with rotation of second faceplate 50, third opening 52 changes position relative to first faceplate 42 to include third opening 52 positioned in one of: alignment with a portion 54 of first opening 44 and with a portion 56 of second opening 46 (as seen in FIG. 8), alignment with first opening 44 (as seen FIG. 9) or alignment with second opening 46 (as seen in FIG. 10). With rotation of handle 32 by user, cartridge assembly 30 rotates and second faceplate 50 of cartridge assembly 30 moves along with third opening 52 relative to first opening 44 and second opening 46. As third opening 52 moves over first and second openings 44 and 46, the temperature of the water changes which eventually exits faucet outlet 20 with water being of different temperatures which flow through first and second openings 44, 46, as will be discussed. Seal member 48 maintains a sealed relationship with second faceplate 50 and seal member 48 maintains a sealed relationship with first faceplate 42 preventing leakage of water between first opening 44 and second opening 46 and without leakage reaching third opening 52, water which reaches faucet outlet 20 maintains precise temperature of water based on the positioning of third opening 52 in relationship to first and second openings 44, 46.

Figure 3:
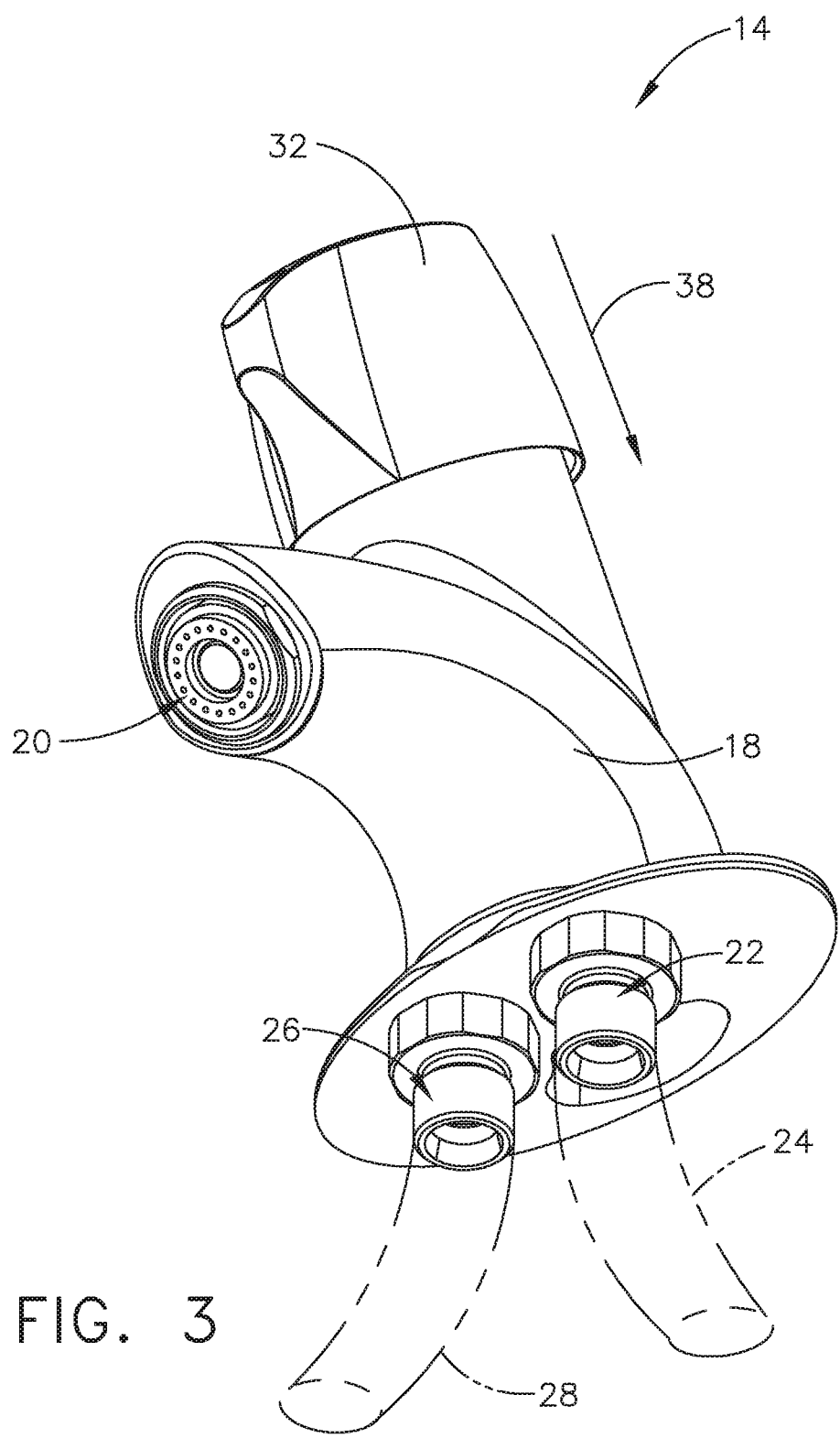
FIG. 3 is a front underside perspective view of the faucet assembly of FIG. 2 assembled.
Figure 4:
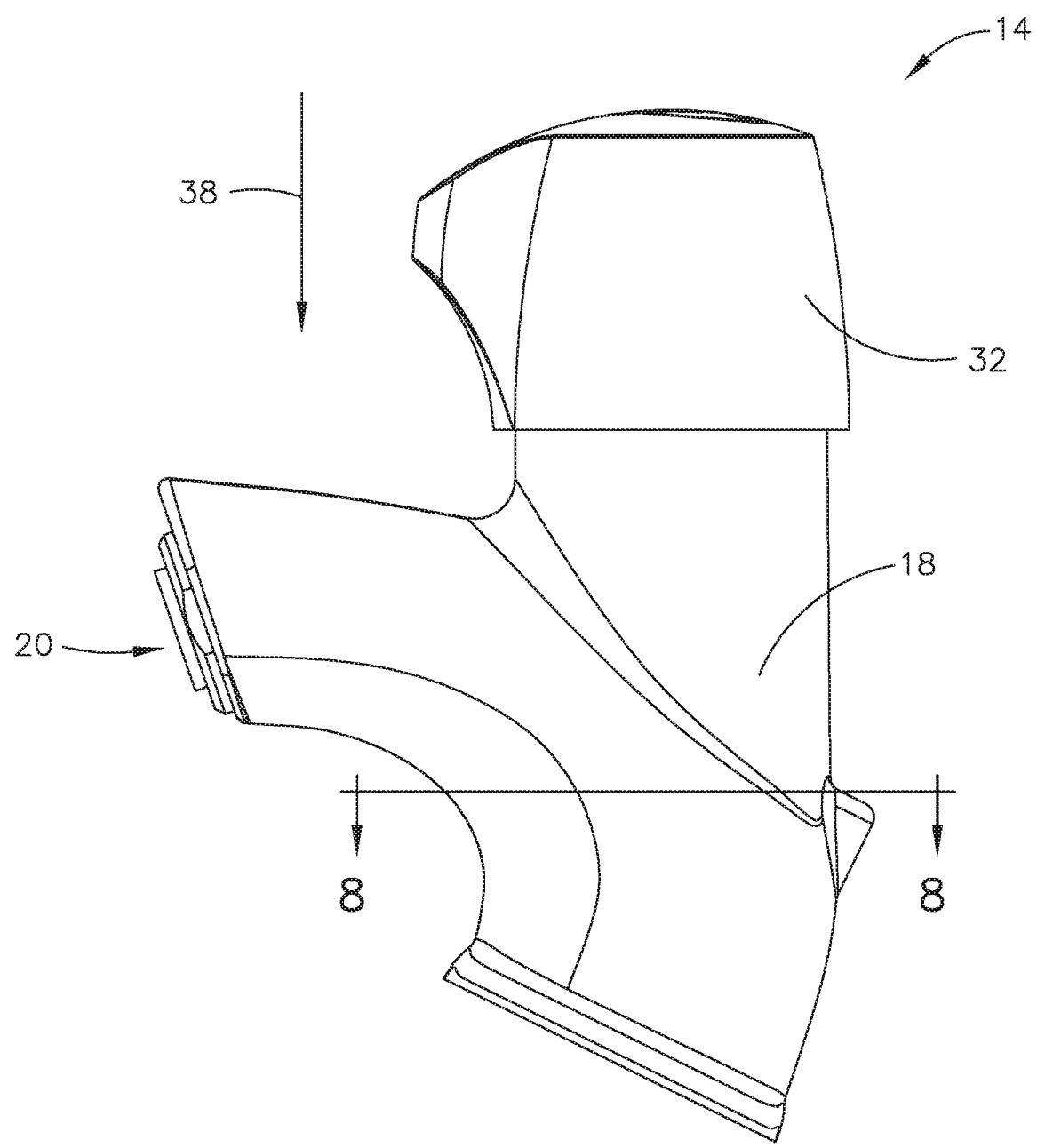
FIG. 4 is a side plan elevation view of the faucet assembly of FIG. 3.

Faucet assembly 14 includes first connector 22 for connecting to a first pressurized water supply conduit 24 and second connector 26 for connecting to second pressurized water supply conduit 28, as seen in FIG. 3. First pressurized water supply conduit 24 contains water having first temperature, often identified as hot, and second water pressurized supply conduit 28 contains water having a second temperature colder in temperature than first temperature, often referred to as cold.

Water from first and second pressurized water supply conduits 24, 28 enter into housing 18 through first connector and second connector 22, 26 respectively, as seen in FIG. 5. Housing 18 defines first channel 58 in fluid communication with the first connector 22 so as to receive water having the first temperature from the first pressurized water supply conduit 24, wherein first opening 44 in first faceplate 42, as seen in FIG. 7, is an exit for first channel 58. Housing 18 defines a second channel (not shown), in this example, second channel is similarly configured as first channel 58, such that second channel is in fluid communication with the second connector 26 to receive water having the second temperature, colder in temperature than the first temperature, from second pressurized water supply conduit 28, wherein second opening 46 of first faceplate 42 is an exit for second channel (not shown), as seen in FIG. 7. First channel 58 conveys water of the first temperature to first opening 44 of first faceplate 42 of housing 18. First opening 44 is in fluid communication with first channel 58. Second channel (not shown) conveys water having a colder temperature than the first temperature to second opening 46 of first faceplate 42 of housing 18 wherein second opening 46 is in fluid communication with second channel (not shown).

Seal member 48 is positioned on side 60 of first faceplate 42, as seen in FIG. 7, which faces second faceplate 50 of cartridge assembly 30 with cartridge assembly 30 positioned within opening 36 of housing 18, as seen in FIGS. 2, 6 and 7. First faceplate 42 defines recess 62 in side 60 of first faceplate 42 for receiving seal member 48, as seen in FIG. 7. Seal member 48 is secured to side 60 of first faceplate 42 within recess 62 with an adhesive. Recess 62 and the adhesive provide securement of seal member 48 such that leakage of water from first and second openings 44, 46 is prevented along first faceplate 42 and with seal member 48 in abutting relationship with second faceplate 50, leakage is prevented from first and second openings 44, 46 along second faceplate 50. As mentioned earlier, with the prevention of leakage from first and second openings 44, 46 to third opening 52, precise water temperature is attained which passes through third opening 52 into chamber 64 of cartridge assembly 30, as seen in FIG. 11, with the water mixing which passed through third opening 52 wherein the user positioned third opening 52 in position which receives water from both first opening and second opening 44, 46 as seen in FIG. 8 or attaining a same temperature if third opening 52 is positioned by user to receive water exclusively from first opening 44 or exclusively from second opening 46, as seen in FIGS. 9 and 10.

In this example, as seen in FIG. 7, seal member 48 has first portion 68 which encircles first and second opening 44, 46. Seal member 48, in this example, has second portion 70 which encircles first portion 68 and is spaced apart from first portion 68. Seal member 48 has third portion 72 which extends from first side 74 of second portion 70 and extends to first portion 68 and joins first portion 68 aligned with first portion which extends between first and second openings 44, 46. Seal member 48 has fourth portion 73 which extends from second opposing side 76 of second portion 70 and extends to first portion 68 and joins first portion 68, aligned with first portion 68 which extends between first and second openings 44, 46.

First enclosed area 78 is formed associated with first opening 44 and second enclosed area 80 is formed associated with second opening 46, as seen in FIG. 7. This configuration of seal member 48 provides a primary seal with respect to first portion 68 of seal member 48 surrounding first and second openings 44, 46 and a secondary seal barrier with second, third and fourth portions 70, 72 and 73 of seal member 48 in further preventing leakage between first opening 44 and second opening 46 such that leakage would be blocked from passing through third opening 52 of second faceplate 50 of cartridge assembly 30.

First and second openings 44, 46 are elongated in shape, as seen in FIG. 7, and extend along first face plate 42 of housing 18 along curved path "P". Third opening 52 is elongated in shape and moves along curved path "P" as cartridge assembly 30 rotates within opening 36 in housing 18, as seen in FIG. 8-10. Third opening 52 extends along second face plate 50 along curved path "P'", as seen in FIG. 6. In this example, third opening 52 moves along curved path "P", as seen in FIGS. 8-10 providing for alignment of third opening 52 passing over first and second openings 44, 46 as user rotates cartridge assembly 30 within opening 36 of housing 18. The adjustment of cartridge assembly 30 by user turning handle 32, positions third opening 52 in desired position over one or both of first and second openings 44, 46 providing a precise temperature of water with seal member 48 positioned between first and second faceplates 42, 50 preventing leakage between first and second openings 44, 46 entering third opening 52.

Faucet assembly 14 provides user a maximum amount of rotation in which handle 32 can be rotated in either rotation direction 34, as seen in FIG. 2, before handle 32 is stopped and thereby limiting rotation of second faceplate 50 and that of rotational travel of third opening 52, as seen in FIGS. 9 and 10. Second faceplate 50 has section 82, as seen in FIGS. 6, 9 and 10, defining recess 84 in second faceplate 50 which extends along circumference "C" of the second faceplate 50 and along radius "R" of second faceplate 50 forming opposing sidewalls 86 of the recess 84, as seen in FIGS. 8-10. Housing 18 forms stop member 88 positioned extending between opposing sidewalls 86 of recess 84 of second faceplate 50.

With opposing sidewalls 86 positioned spaced apart from stop member 88, third opening 52 of second faceplate 50 of cartridge assembly 30 is positioned aligned with portion 54 of first opening 44 and portion 56 of second opening 46, as seen in FIG. 8. The user is permitting the different temperatures of water to pass through third opening 52 without unwanted leakage passing from first and second openings 44, 46 through third opening 52 and thereby providing precise temperature of water to mix within in chamber 64 of cartridge assembly 30 as seen in FIG. 11 and pass to chamber 66 of valve cartridge assembly 40.

In FIG. 9, the user is able to turn handle 32 and third opening 52 until opposing sidewall 86 is stopped by side 89 of stop member 88 and third opening 52 aligns with first opening 44 so as to exclusively receive water from first opening 44. The water received from first opening 44 is water at the temperature of the water contained within pressurized water supply conduit 24, which will pass through third opening 52 and travel to chamber 66 of valve cartridge assembly 40, seen in FIG. 11. In this configuration of this example, the temperature of the water reaching chamber 64 of cartridge assembly 30 and chamber 66 of valve cartridge assembly 40 is the hottest water available for faucet assembly 14, without leakage of water from second opening 46 reaching third opening 52.

In contrast, in FIG. 10, the user is able to turn handle 32 and third opening 52 until opposing sidewall 86 is stopped by 91 of stop member 88 and third opening 52 aligns with second opening 46 so as to exclusively receive water from second opening 46. The water received from second opening 46 is water at the temperature of the water contained within second pressurized water supply conduit 28, which will pass through third opening 52 and travel to chamber 66 of valve cartridge assembly 40. In this configuration of this example, the water temperature reaching chamber 64 of cartridge assembly 30 and chamber 66 of valve cartridge assembly 40 is the coldest water available for faucet assembly 14, without leakage of water from first opening 44 reaching third opening 52.

With water positioned within chamber 66 of valve cartridge assembly 40, float 90 maintains water contained within chamber 66. With user pushing handle 32 in downwardly direction 38, as seen in FIG. 11, cap member 92, which engages rod member 94 of valve cartridge assembly 40, pushes in downwardly direction 38 on float 90 moving float 90 (not shown) away from inlet 95 of valve cartridge assembly 40 releasing pressurized water contained in chamber 66 of valve cartridge assembly 40 to flow to outlet 96 within valve cartridge assembly 40 and pass through an opening in cartridge assembly 30 (not shown) and out of outlet 97, as seen in FIG. 6, and into an annular channel 98. The pressurized water with a precise temperature then travels within annular channel 98 to outlet channel 100, as seen in FIG. 11, and exits faucet assembly 14 at faucet outlet 20. As handle 32 rises in direction 102 assisted with, for example, spring force from spring 103 rod member 94 rises in direction 102 and float 90 rises and closes inlet 95 of valve cartridge assembly 40 and stops the flow of water out of chamber 66 of valve cartridge assembly 40 resulting in water being stopped from flowing out of faucet outlet 20.

Figure 12:
FIG. 12 is a flow chart of a method for installing a cartridge assembly into a housing of the faucet assembly.

In referring to FIG. 12, method 104 for installing cartridge assembly 30 into housing 18 of faucet assembly 14 includes inserting 106 cartridge assembly 30 into an opening 36 of housing 18 of faucet assembly 14. Housing 18 includes first faceplate 42 wherein first faceplate 42 defines first opening 44 and second opening 46, which extend through first faceplate 42 and are spaced apart from one another. Seal member 48 is positioned on first faceplate 42, wherein seal member 48 surrounds first opening 44 and second opening 46. Method 104 further includes abutting 108 second faceplate 50 of cartridge assembly 30 against seal member 48 forming a seal between second faceplate 50 and seal member 48. Second faceplate 50 defines third opening 52 which extends through second faceplate 50. With rotation of second faceplate 50 of cartridge assembly 30 third opening 52 changes position relative to first faceplate 42 to include third opening positioned in one of: alignment with a portion 54 of first opening 44 and with portion 56 of second opening 46, alignment with first opening 44 or alignment with second opening 46.

Housing 18 includes first connector 22 for connecting to first pressurized water supply conduit 24 and second connector 26 for connecting to second pressurized water supply conduit 28. First water pressurized supply conduit 24 contains water, as discussed above, having a first temperature and the second pressurized water supply conduit 28 contains water having a second temperature colder in temperature than the first temperature.

Seal member 48 is positioned on side 60 of first faceplate 42 which faces cartridge assembly 30 with cartridge assembly 30 positioned within housing 18. First faceplate 42 defines recess 62 in side 60 of first faceplate 42 for receiving seal member 48, as discussed earlier. Seal member 48 has first portion 68 which encircles first and second openings 44, 46. Seal member 48 has second portion 70 which encircles first portion 68 and is spaced apart from first portion 68. Seal member 48 has third portion 72 which extends from first side 74 of second portion 70 between first portion 68 and second portion 70. Seal member 48 has fourth portion 73 which extends from second opposing side 76 of second portion 70 between first portion 68 and second portion 70.

While various embodiments have been described above, this disclosure is not intended to be limited thereto. Variations can be made to the disclosed embodiments that are still within the scope of the appended claims.

What is claimed:

1. A faucet assembly, comprising:
a housing including a first faceplate wherein the first faceplate defines a first opening and a second opening which extend through the first faceplate and are spaced apart from one another;
a seal member positioned on and secured to the first faceplate, wherein the seal member surrounds the first opening and the second opening; and
a cartridge assembly positioned within an opening in the housing, wherein:
the cartridge assembly includes a second faceplate, which abuts the seal member and forms a seal between the second faceplate and the seal member; and
the second faceplate defines a third opening which extends through the second faceplate, wherein with rotation of the second faceplate, the third opening changes position relative to the first faceplate to include the third opening positioned in one of alignment with a portion of first opening and with a portion of the second opening, alignment with the first opening or alignment with the second opening.

2. The faucet assembly of claim 1, wherein the housing includes a first connector for connecting to a first pressurized water supply conduit and a second connector for connecting to a second pressurized water supply conduit.

3. The faucet assembly of claim 2, wherein the first pressurized water supply conduit contains water having a first temperature and the second water pressurized supply conduit contains water having a second temperature colder in temperature than the first temperature.

4. The faucet assembly of claim 3, wherein the housing defines a first channel in fluid communication with the first connector to receive water having the first temperature from the first pressurized water supply conduit and the housing defines a second channel in fluid communication with the second connector to receive water having the second temperature colder in temperature than the first temperature.

5. The faucet assembly of claim 4, the first channel conveys water of the first temperature to the first opening of the first faceplate of the housing wherein the first opening is in fluid communication with the first channel and the second channel conveys water having a colder temperature than the first temperature to the second opening the first faceplate of the housing wherein the second opening is in fluid communication with the second channel.

6. The faucet assembly of claim 1, wherein the seal member is positioned on a side of the first faceplate which faces the cartridge assembly with the cartridge assembly positioned within the opening of the housing.

7. The faucet assembly of claim 6, wherein the first faceplate defines a recess in the side of the first faceplate for receiving the seal member.

8. The faucet assembly of claim 7, wherein the seal member is secured to the side of the first faceplate within the recess with an adhesive.

9. The faucet assembly of claim 1, wherein the seal member has a first portion which encircles the first and second openings.

10. The faucet assembly of claim 9, wherein the seal member has a second portion which encircles the first portion and is spaced apart from the first portion.

11. The faucet assembly of claim 10, wherein:
the seal member has a third portion which extends from a first side of the second portion and extends to the first portion and joins the first portion aligned with first portion which extends between the first and the second openings; and
the seal member has a fourth portion which extends from a second opposing side of the second portion and extends to the first portion and joins the first portion aligned with the first portion which extends between the first and the second openings.

12. The faucet assembly of claim 1, wherein the first opening and the second opening are elongated in shape wherein the first and second openings extend along the first face plate along a curved path.

13. The faucet assembly of claim 12, wherein the third opening is elongated in shape and moves along the curved path as cartridge assembly rotates within the opening in the housing.

14. The faucet assembly of claim 13, wherein the third opening extends along the second face plate along a curved path.

15. The faucet assembly of claim 1, wherein the second faceplate has a section of the second faceplate defining a recess in the second faceplate which extends along a circumference of the second faceplate and along a radius of the second faceplate forming opposing sidewalls of the recess.

16. The faucet assembly of claim 15, wherein the housing forms a stop member positioned extending between opposing sidewalls of the recess of the second faceplate.

17. A method for installing a cartridge assembly into a housing of a faucet assembly, comprising:
inserting the cartridge assembly into an opening of the housing of the faucet assembly, wherein:
the housing includes a first faceplate wherein the first faceplate defines a first opening and second opening, which extend through the first faceplate and are spaced apart from one another; and
a seal member positioned on and secured to the first faceplate, wherein the seal member surrounds the first opening and the second opening; and
abutting a second faceplate of the cartridge assembly against the seal member forming a seal between the second faceplate and the seal member, wherein:
the second faceplate defines a third opening which extends through the second faceplate; and
with rotation of the second faceplate of the cartridge assembly the third opening changes position relative to the first faceplate to include the third opening positioned in one of: alignment with a portion of first opening and with a portion of the second opening, alignment with the first opening or alignment with the second opening.

18. The method of claim 17, wherein:
the housing includes a first connector for connecting to a first pressurized water supply conduit and a second connector for connecting to a second pressurized water supply conduit; and
the first water pressurized supply conduit contains water having a first temperature and the second pressurized water supply conduit contains water having a second temperature colder in temperature than the first temperature.

19. The method of claim 17, wherein:
the seal member is positioned on a side of the first faceplate which faces the cartridge assembly with the cartridge assembly positioned within the housing; and
the first faceplate defines a recess in the side of the first faceplate for receiving the seal member.

20. The method of claim 17, wherein:
the seal member has a first portion which encircles the first and second openings;
the seal member has a second portion which encircles the first portion and is spaced apart from the first portion;
the seal member has a third portion which extends from a first side of the second portion between the first portion and the second portion; and
the seal member has a fourth portion which extends from a second opposing side of the second portion between the first portion and the second portion.

* * * * *